(12) United States Patent
Namkoong et al.

(10) Patent No.: US 9,575,482 B2
(45) Date of Patent: Feb. 21, 2017

(54) APPARATUS AND METHOD FOR ADJUSTING A VOLTAGE IN A POWER DISTRIBUTION SYSTEM

(75) Inventors: Won Namkoong, Daejeon (KR); Bok-Nam Ha, Daejeon (KR); Sung-Woo Lee, Daejeon (KR); In-Yong Seo, Daejeon (KR); Moon-Jong Jang, Daejeon (KR); Dong-Wan Seo, Daejeon (KR); Sang-Ok Kim, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 384 days.

(21) Appl. No.: 14/347,419

(22) PCT Filed: Sep. 30, 2011

(86) PCT No.: PCT/KR2011/007282
§ 371 (c)(1),
(2), (4) Date: Mar. 26, 2014

(87) PCT Pub. No.: WO2013/047932
PCT Pub. Date: Apr. 4, 2013

(65) Prior Publication Data
US 2014/0244061 A1  Aug. 28, 2014

(30) Foreign Application Priority Data
Sep. 27, 2011 (KR) .................. 10-2011-0097331

(51) Int. Cl.
*G05D 3/12* (2006.01)
*G05B 19/02* (2006.01)
(Continued)

(52) U.S. Cl.
CPC ................. *G05B 19/02* (2013.01); *H02J 3/14* (2013.01); *H02J 3/32* (2013.01); *Y02B 70/3225* (2013.01); *Y04S 20/222* (2013.01)

(58) Field of Classification Search
CPC ...................................................... G05B 19/02
(Continued)

(56) References Cited

U.S. PATENT DOCUMENTS 5,329,222 A * 7/1994 Gyugyi ................. H02J 3/1814
307/102
5,760,492 A * 6/1998 Kanoi ....................... H02J 3/06
307/18

(Continued)

FOREIGN PATENT DOCUMENTS

JP 2008-228428 A 9/2008
KR 10-2004-0038127 A 5/2004
(Continued)

OTHER PUBLICATIONS

Tabisz, Wojciech A., Milan M. Jovanovic, and Fred C. Lee. "Present and future of distributed power systems." IEEE Applied Power Electronics Conference, 0-7803-0485-3/92. 1992. pp. 11-18.*

(Continued)

*Primary Examiner* — Satish Rampuria
(74) *Attorney, Agent, or Firm* — McDermott Will & Emery LLP

(57) ABSTRACT

The present invention relates to an apparatus and method for performing adjustment to optimize the voltage for each distribution network in a power distribution system. The apparatus for adjusting a voltage in the power distribution system adjusts the voltage by switching a switch that lies on a path in the power distribution system. The apparatus determines a switch that is to become a switching target from among switches lying on the path, obtains a voltage optimization value of the determined switching target switch, selects a switch having the minimum voltage opti- (Continued)

mization value by changing the switching target switch to another switch in order to obtain the voltage optimization value, and adjusts the voltage through switching of the selected switch.

16 Claims, 5 Drawing Sheets

(51) Int. Cl.
*H02J 3/14* (2006.01)
*H02J 3/32* (2006.01)

(58) Field of Classification Search
USPC .................................................. 700/286–296
See application file for complete search history.

(56) References Cited

U.S. PATENT DOCUMENTS

| | | | | |
|---|---|---|---|---|
| 7,492,128 B2* | 2/2009 | Shen | ...................... | H02J 7/0063 307/149 |
| 7,539,881 B2* | 5/2009 | Shaw | ...................... | G06F 1/3203 713/300 |
| 7,818,595 B2* | 10/2010 | Kern | ...................... | G06F 11/24 713/300 |
| 8,719,601 B2* | 5/2014 | Chang | ...................... | G06F 1/266 713/300 |
| 2001/0010032 A1* | 7/2001 | Ehlers | ...................... | G05B 15/02 702/62 |
| 2008/0077368 A1* | 3/2008 | Nasle | ...................... | G05B 17/02 703/4 |
| 2009/0228843 A1* | 9/2009 | Anemikos | ........... | G06F 17/5045 716/132 |
| 2012/0193984 A1* | 8/2012 | Krok | ...................... | H02J 3/1807 307/31 |

FOREIGN PATENT DOCUMENTS

| KR | 10-2006-0017111 A | 2/2006 |
|---|---|---|
| KR | 10-1039427 B1 | 6/2011 |

OTHER PUBLICATIONS

Yoshida, Hirotaka, et al. "A particle swarm optimization for reactive power and voltage control considering voltage security assessment." Power Systems, IEEE Transactions on 15.4 (2000): pp. 1232-1239.*

Senjyu, Tomonobu, et al. "Optimal distribution voltage control and coordination with distributed generation." Power Delivery, IEEE Transactions on 23.2 (2008): pp. 1236-1242.*

Guerrero, Josep M., et al. "A wireless controller to enhance dynamic performance of parallel inverters in distributed generation systems." IEEE Transactions on Power Electronics 19.5 (2004): pp. 1205-1213.*

Pillai, Padmanabhan, and Kang G. Shin. "Real-time dynamic voltage scaling for low-power embedded operating systems." ACM SIGOPS Operating Systems Review. vol. 35. No. 5. ACM, 2001. pp. 89-102.*

Shang, Li, Li-Shivan Peh, and Niraj K. Jha. "Dynamic voltage scaling with links for power optimization of interconnection networks." High-Performance Computer Architecture, 2003. HPCA-9 2003. Proceedings. The Ninth International Symposium on. IEEE, 2003. pp. 1-12.*

International Search Report, w/ English translation thereof, issued in International Application No. PCT/KR2011/007282 dated Sep. 26, 2012.

* cited by examiner

APPARATUS AND METHOD FOR ADJUSTING A VOLTAGE IN A POWER DISTRIBUTION SYSTEM

RELATED APPLICATIONS

This application is the U.S. National Phase under 35 U.S.C. §371 of International Application No. PCT/KR2011/007282, filed on Sep. 30, 2011, which in turn claims the benefit of Korean Application No. 10-2011-0097331, filed on Sep. 27, 2011, the disclosures of which Applications are incorporated by reference herein.

TECHNICAL FIELD

The present invention relates to an apparatus and method for controlling voltage in a power distribution system. More particularly, the present invention relates to an apparatus and method for optimizing voltage by controlling the voltage in a power distribution system on a power distribution line basis.

This application claims the benefit of the filing date of Korean Patent Application No. 10-2011-0097331 filed on Sep. 27, 2011, the entire content of which is incorporated herein by reference.

BACKGROUND ART

In a situation in which factors in the variation of voltage, such as distributed power sources and an electric vehicle charging station, are associated with a power distribution line, there is a need for an apparatus for controlling variation in voltage in a power distribution system.

Apparatuses for controlling variations in voltage in a power distribution system may include, for example, a tap switching device when a load is applied, and a capacitor bank. These apparatuses are problematic in that it is difficult to solve a voltage problem in an overall power distribution line because voltage can be controlled only on a bank basis.

In order to solve the problem, a device, such as a line voltage control device, is installed in the middle of a power distribution line. However, it is difficult to apply such a line voltage control device to a current system within a short period because the line voltage control device is expensive.

Furthermore, in methods for solving a voltage problem in a power distribution line, circulation current that may occur upon the switching of a switch is not taken into account, and an operation in conjunction with a tap switching device is not performed when a load is applied.

DISCLOSURE

Technical Problem

An object of the present invention is to provide an apparatus and method for optimizing voltage by controlling the voltage in a power distribution system on a power distribution line basis.

Technical Solution

In order to accomplish the above object, in accordance with an embodiment of the present invention, there is provided a voltage control apparatus for controlling voltage through switching of a switch present on a path in a power distribution system, the apparatus including:

a voltage optimization unit configured to determine switching-target switches from among switches present on the path, and to calculate a voltage optimization value of the determined switching-target switches; and a switch selection unit configured to select a switch corresponding to a location at which a voltage optimization value is minimum while moving locations of the switching-target switches, and to control voltage of the selected switch through switching of the selected switch.

The switching of the switch may be performed at a switch present on the path between points of two power distribution lines.

The voltage optimization unit may include a voltage distribution value calculation unit configured to calculate a voltage distribution value of a transformer and a voltage distribution value of a power distribution line corresponding to the switching-target switches; a normalization unit configured to normalize the voltage distribution value of the transformer and the voltage distribution value of the power distribution line; and an optimization unit configured to calculate a voltage optimization value by applying target coefficients to each of the normalized values.

The voltage distribution value calculation unit may calculate the voltage distribution value of the transformer using a target operation value of each substation, an operating voltage value of the substation, and a total number of transformers.

The voltage distribution value calculation unit may calculate the voltage distribution value of the power distribution line using a target operating voltage value of the power distribution line, a voltage value between switches on the power distribution line, and the number of switch sections on the power distribution line.

The optimization unit may apply a target coefficient corresponding to voltage optimization of a substation and a target coefficient corresponding to voltage optimization of the power distribution line to each of the normalized values.

The switch selection unit may select the specific switch from among the target-switching switches, may compare the amount of circulation current with an allowable value when the specific switch is closed, and may select a switch corresponding to a location at which the voltage optimization value is minimum based on results of the comparison.

If the amount of circulation current is larger than the allowable value, the switch selection unit may select another switch other than the specific switch from among the switching-target switches, and may compare the amount of circulation current with the allowable value again when the other switch is closed.

If the amount of circulation current is equal to or lower than the allowable value, the switch selection unit may select a switch corresponding to a location at which the voltage optimization value is minimum while moving the locations of the switching-target switches.

The voltage control apparatus may further include a check unit configured to check whether or not the voltage optimization values of all the switches on the path have been calculated, and to check whether or not the voltage optimization value of the selected switch is lower than the voltage optimization value obtained by the voltage optimization unit.

The voltage control apparatus may further include a tap selection unit configured to select a tap that allows a bank-based voltage optimization value to be minimum while switching between the taps of a tap switching device when a load is applied.

The tap selection unit may calculate the bank-based voltage optimization value using a target operating voltage value of the power distribution line, a voltage value between switches of the power distribution line within the bank, and a number of switch sections within the bank.

In order to accomplish the above object, in accordance with another embodiment of the present invention, there is provided a method of controlling voltage in a power distribution system, the method including:

determining switching-target switches from among switches present on a path in the power distribution system; calculating voltage optimization values of the determined switching-target switches; selecting a switch corresponding to a location at which the voltage optimization value is minimum while moving locations of the switching-target switches; and controlling voltage of the selected switch through switching of the selected switch.

Calculating the voltage optimization values may include calculating a voltage distribution value of a transformer and a voltage distribution value of a power distribution line corresponding to the switching-target switches; normalizing the voltage distribution value of the transformer and the voltage distribution value of the power distribution line; and calculating each of the voltage optimization values by applying target coefficients to each of the normalized values.

The voltage distribution value of the transformer may be calculated using a target operation value of each substation, an operating voltage value of the substation, and a total number of transformers.

The voltage distribution value of the power distribution line may be calculated using a target operating voltage value of the power distribution line, a voltage value between switches on the power distribution line, and the number of switch sections on the power distribution line.

Controlling of the voltage may include selecting a tap that allows a bank-based voltage optimization value to be minimum while switching between taps of a tap switching device when a load is applied; and controlling the voltage via the tap.

Selecting the switch may include selecting a specific switch from among the switching-target switches, comparing an amount of circulation current with an allowable value when the specific switch is closed, and selecting a switch corresponding to a location at which the voltage optimization value is minimum based on results of the comparison.

Advantageous Effects

In accordance with an embodiment of the present invention, the apparatus and method for controlling voltage in a power distribution system can optimize voltage by controlling the voltage on a power distribution line basis, thereby maintaining appropriate voltage for each power distribution line.

Furthermore, in accordance with an embodiment of the present invention, the apparatus and method for controlling voltage in a power distribution system can optimize voltage by controlling the voltage on a power distribution line basis through the switching of a switch, and can minimize the difference between operating voltage and target operating voltage by additionally manipulating a tap switching device when a load is applied.

BEST MODE

Figure 1:
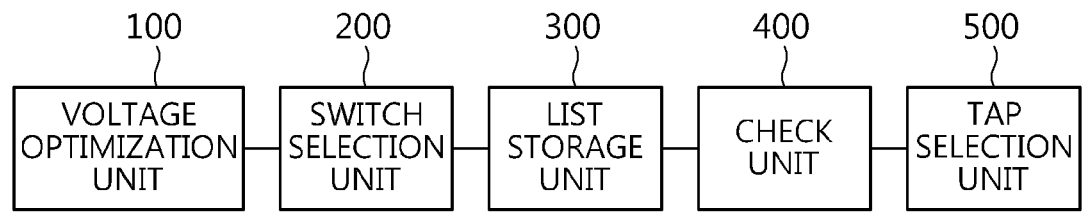
FIG. 1 is a diagram schematically illustrating the configuration of an apparatus for controlling voltage in a power distribution system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

An apparatus and method for controlling operating voltage in a power distribution system according to embodiments of the present invention will be described in detail below with reference to the accompanying drawings.

Figure 3:
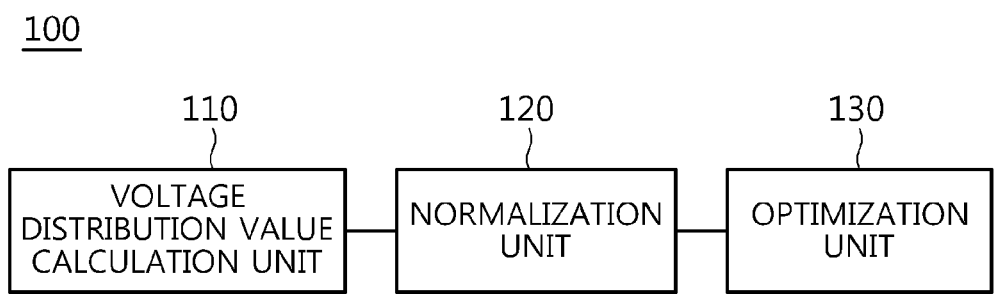
FIG. 3 is a diagram illustrating the configuration of the voltage optimization unit of the apparatus for controlling voltage in a power distribution system according to an embodiment of the present invention.

FIG. 1 is a diagram schematically illustrating the configuration of an apparatus for controlling voltage in a power distribution system according to an embodiment of the present invention. Furthermore, FIG. 3 is a diagram illustrating the configuration of the voltage optimization unit of the apparatus for controlling voltage in a power distribution system according to an embodiment of the present invention.

Referring to FIG. 1, the apparatus for controlling voltage in a power distribution system includes a voltage optimization unit 100, a switch selection unit 200, a list storage unit 300, a check unit 400, and a tap selection unit 500.

The voltage optimization unit 100 determines switching-target switches from among switches present on a path, normalizes the voltage distribution value of a power distribution line and the voltage distribution value of a transformer corresponding to the determined switching-target switches, and calculates a voltage optimization value V by applying target coefficients corresponding to an object to each of the normalized values. In this case, the power distribution line and the transformer are a power distribution line and a transformer corresponding to the switching-target switches.

More particularly, the voltage optimization unit 100 determines switches, which enable power distribution lines present radially on both sides of the open switch to become a loop power distribution line when open switches are closed in the power distribution system, to be switching-target switches.

Figure 2:
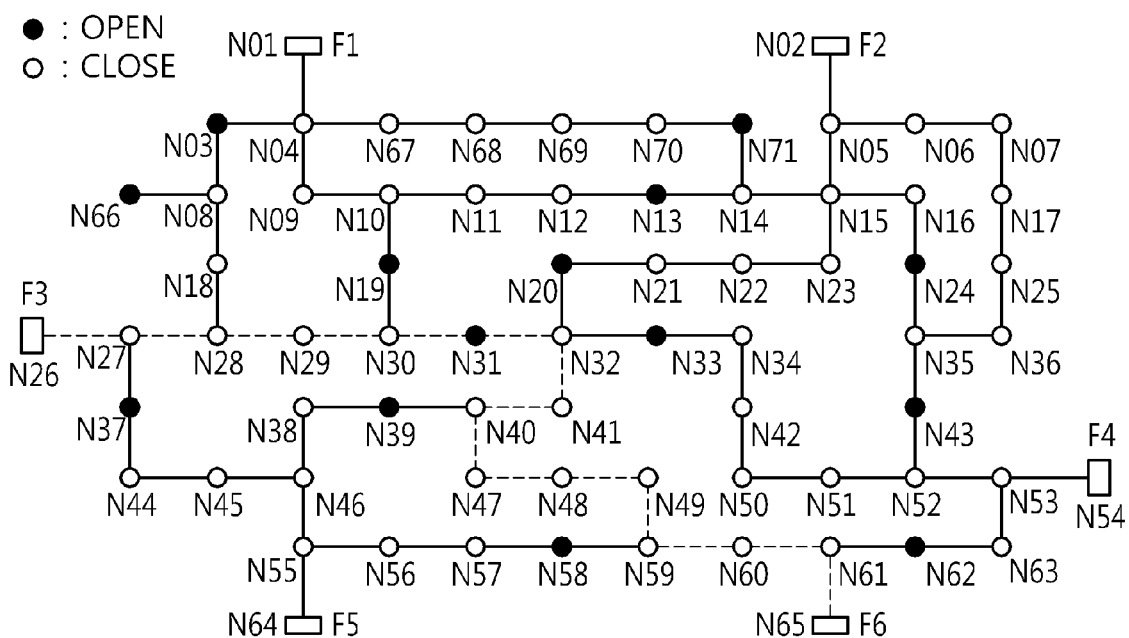
FIG. 2 is a diagram illustrating power distribution lines in which switching-target switches are placed according to an embodiment of the present invention.

As illustrated in FIG. 2, when a first switch N31 is open, a power distribution line extending from F3 to a first switch N31 and a power distribution line extending from F6 to the first switch N31 based on the first switch N31 are changed from radial-type power distribution lines to a loop-type power distribution line. In this case, the first switch N31 is a switch that will be switched. The first switch N31 is present on a path on which switches N27, N28, N29, N30, N31, N32, N41, N40, N47, N48, N49, N59, N60, and N61 between F3 and F6 are present.

The switching of a switch according to an embodiment of the present invention is performed at the switch on a path that is present between the start points (e. g., F3 and F6) of two power distribution lines.

Referring to FIG. 2, the voltage optimization unit 100 includes a voltage distribution value calculation unit 110, a normalization unit 120, and an optimization unit 130.

The voltage distribution value calculation unit 110 calculates the voltage to distribution value of a transformer and the voltage distribution value of a power distribution line using Equations 1 and 2. In this case, the voltage distribution value of the power distribution line is a voltage distribution value in the section between switches present on power distribution lines, that is, between the switches.

$$V_{TR} = \frac{1}{N_{TR}} \sum_{TRi=1}^{N_{TR}} (V_{TRgoal} - V_{TRi})^2 \quad (1)$$

In Equation 1, $V_{TRgoal}$ is the target operating voltage value of each substation, $V_{TRi}$ is the operating voltage value of the substation, and $N_{TR}$ is the total number of transformers.

$$V_D = \frac{1}{N_D} \sum_{Di=1}^{N_D} (V_{Dgoal} - V_{Di})^2 \quad (2)$$

In Equation 2, $V_{Dgoal}$ is the target operating voltage value of a power distribution line, $V_{Di}$ is a voltage value between switches present in corresponding power distribution lines, and $N_D$ is the number of switch sections in the entire section, that is, on a power distribution line.

The normalization unit 120 normalizes the voltage distribution value of each transformer and the voltage distribution value of each power distribution line.

The optimization unit 130 calculates a voltage optimization value V by applying a target coefficient, corresponding to an object, to each of the values normalized by the normalization unit 120. In this case, the voltage optimization value is represented by Equation 3:

$$V = C_{TR} \frac{V_{TR} - V^{O_{TR}}}{V^{I_{TR}} - V^{O_{TR}}} + C_D \frac{V_D - V^{O_D}}{V^{I_D} - V^{O_D}} \quad (3)$$

In Equation 3, $C_{TR}$ is a target coefficient corresponding to the voltage optimization of a substation, $V^{O_{TR}}$ is an initial substation voltage optimization index, and $V^{O_D}$ is a substation voltage optimization solution. Furthermore, $C_D$ is a target coefficient corresponding to the voltage optimization of a power distribution line, $V^{I_D}$ is an initial power distribution line voltage optimization index, and $V^{O_D}$ is a power distribution line voltage optimization solution.

In accordance with this embodiment of the present invention, the difference between the operating voltage and regular operating voltage of a power distribution line may be reduced by performing the switching of the switch so that the results of Equation 3, that is, a voltage optimization value V, is reduced.

The switch selection unit 200 selects a specific switch from among the switching-target switches that have been determined by the voltage optimization unit 100, compares the amount of circulation current at the time at which the specific switch is closed with an allowable value, and selects a switch whose voltage optimization value is minimum based on the results of the comparison.

More particularly, if the amount of circulation current is higher than the allowable value, the switch selection unit 200 selects another switch other than the specific switch from among the determined switching-target switches, and compares the amount of circulation current at the time at which the other switch is closed with the allowable value.

If the amount of circulation current is equal to or lower than the allowable value, the switch selection unit 200 selects the specific switch, and selects a switch corresponding to a location at which the voltage optimization value V is minimum while moving the location of the selected specific switch. Furthermore, the switch selection unit 200 optimizes voltage by controlling the voltage through the switching of the selected switch.

The list storage unit 300 includes a list of switches. Furthermore, the list storage unit 300 modifies the list of switches based on the switch that has been finally selected by the switch selection unit 200.

The check unit 400 checks whether or not the voltage optimization values of all the switches present on a path have been calculated, and checks whether or not the voltage optimization value of the switch selected by the switch selection unit 200 is lower than the voltage optimization value V obtained by the voltage optimization unit 100.

If the voltage optimization value of the switch selected by the switch selection unit 200 is lower than the voltage optimization value V obtained by the voltage optimization unit 100, the check unit 400 selects switching-target switches from among the switches on the path again.

If the voltage optimization value of the switch selected by the switch selection unit 200 is higher than the voltage optimization value V obtained by the voltage optimization unit 100, the tap selection unit 500 selects a tap that allows a bank-based voltage optimization value V to be minimum while switching between the taps of a tap switching device when a load is applied. In this case, the bank-based voltage optimization value is represented by Equation 4:

$$V_{BD} = \frac{1}{N_{BD}} \sum_{BDi=1}^{N_{BD}} (V_{Dgoal} - V_{BDi})^2 \quad (4)$$

In Equation 4, $V_{Dgoal}$ is the target operating voltage value of a power distribution line, $V_{BDi}$ is a voltage value between the switches of power distribution lines within a bank, and $N_{BD}$ is the number of sections between switches within the bank.

Changes in radial distribution lines and the locations of switches on the distribution lines through the switching of a switch will be described in detail below with reference to FIG. 4.

Figure 4:
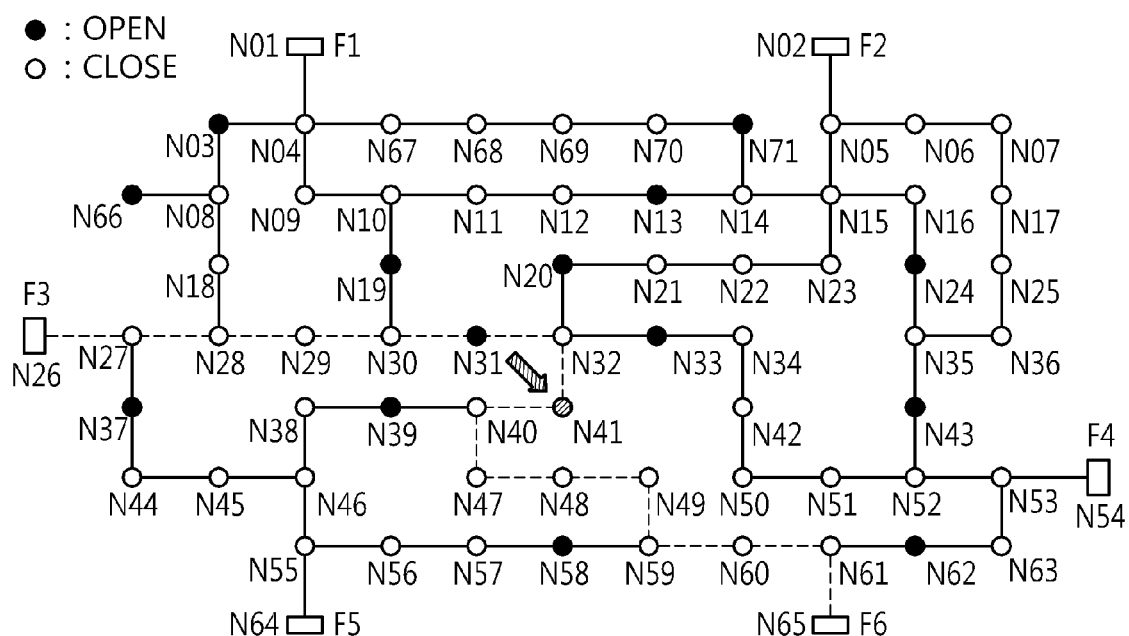
FIG. 4 is a diagram illustrating the switching of a switch according to an embodiment of the present invention.

FIG. 4 is a diagram illustrating the switching of a switch according to an embodiment of the present invention.

Referring to FIG. 4, a switch that separates power distribution lines starting from F3 and F6 is a first switch N31.

The apparatus for controlling voltage in a power distribution system sets a switch, which belongs to switches present on a path from F3 to F6 and has the lowest voltage optimization value, as a separation switch. For example, if a second switch N41 of the switches present on the path from F3 to F6 has the lowest voltage optimization value, the apparatus for controlling voltage in a power distribution system switches the separation switch from the first switch N31 to the second switch N41. That is, the apparatus for controlling voltage in a power distribution system switches the second switch N41 from a closed state to an open state, and switches the first switch N31 from an open state to a closed state.

A method of controlling voltage in a power distribution system will be described in detail below with reference to FIG. 5.

Figure 5:
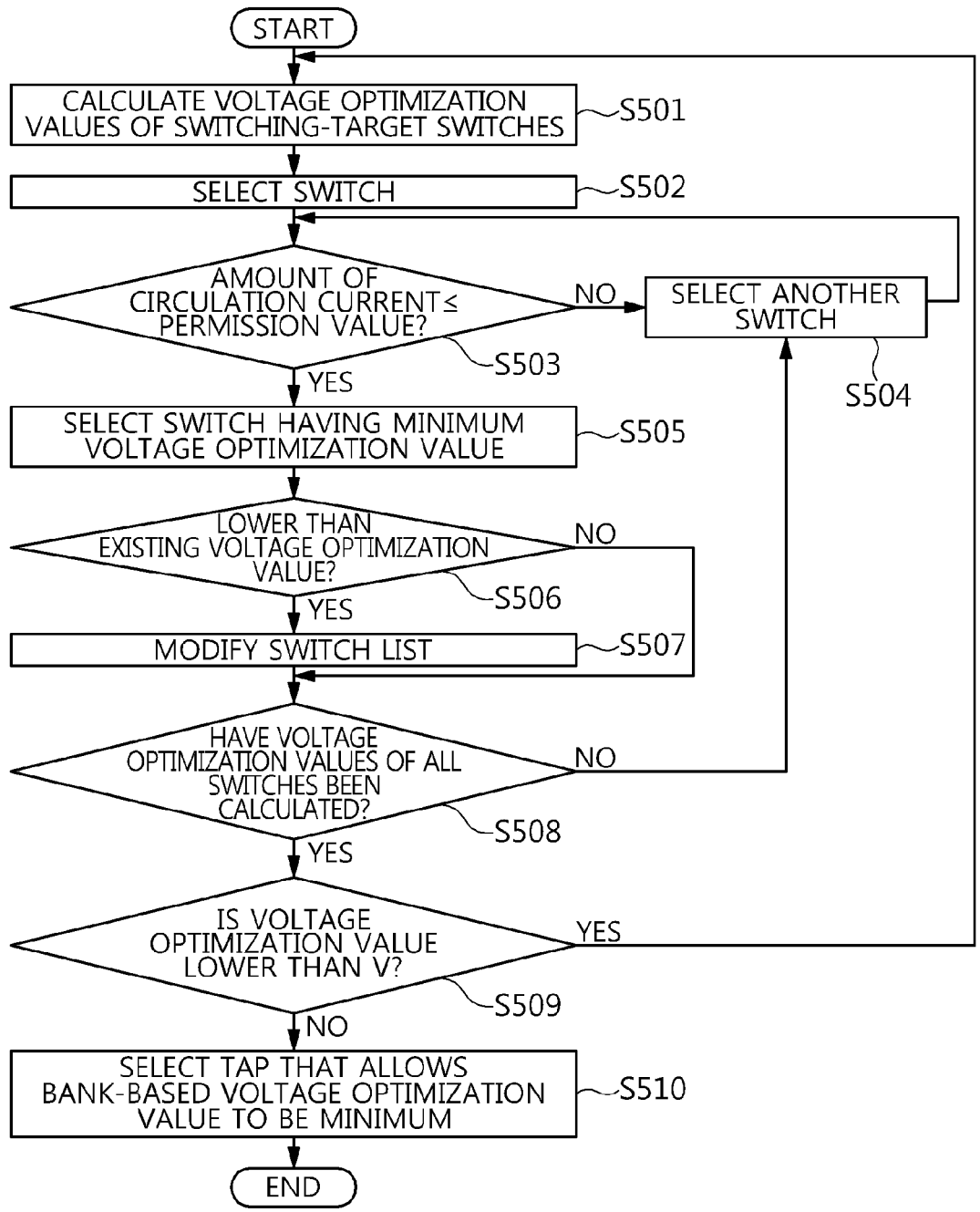
FIG. 5 is a flowchart illustrating a method of controlling voltage in a power distribution system according to an embodiment of the present invention.

FIG. 5 is a flowchart illustrating a voltage control method in a power distribution system according to an embodiment of the present invention.

Figure 6:
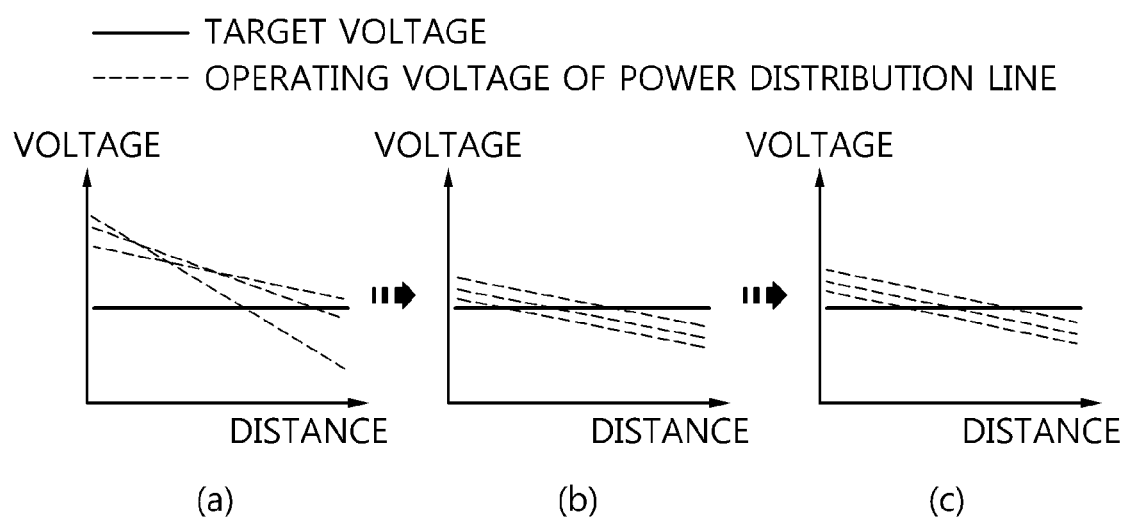
FIG. 6 is a graph illustrating the stabilization of voltage according to an embodiment of the present invention.

Furthermore, FIG. 6 shows a graph illustrating the stabilization of voltage according to an embodiment of the present invention.

First, the apparatus for controlling voltage in a power distribution system determines switching-target switches from among switches present on a path, but the present invention is not limited thereto. In this case, the apparatus for controlling voltage in a power distribution system may determine switches, each of which allows power distribution lines present radially on both sides of the open switch to become a loop power distribution line when open switches are closed in the power distribution system, to be switching-target switches. That is, the switching of a switch is performed at the switch that is present on a path between the start points of two power distribution lines.

Referring to FIG. 5, the apparatus for controlling voltage in a power distribution system normalizes the voltage distribution value of a power distribution line and the voltage distribution value of a transformer corresponding to the switching-target switches and calculates a voltage optimization value V by applying target coefficients corresponding to an object to each of the normalized values at step S501.

The apparatus for controlling voltage in a power distribution system selects a specific switch from among the switching-target switches at step S502.

The apparatus for controlling voltage in a power distribution system determines whether or not the amount of circulation current is equal to or lower than an allowable value when the specific switch is closed at step S503.

If the amount of circulation current is higher than the allowable value, the apparatus for controlling voltage in a power distribution system selects another switch other than the specific switch from among the switching-target switches at step S504. Furthermore, the apparatus for controlling voltage in a power distribution system determines whether or not the amount of circulation current is equal to or lower than the allowable value when the other switch is closed again at step S503.

If the amount of circulation current is equal to or lower than the allowable value, the apparatus for controlling voltage in a power distribution system selects the specific switch and selects a switch whose voltage optimization value is minimum while moving the location of the selected specific switch at step S505.

The apparatus for controlling voltage in a power distribution system determines whether or not the voltage optimization value of the selected switch is lower than an existing voltage optimization value at step S506. In this case, the existing voltage optimization value may have been previously set, but may be the voltage optimization value calculated at step S501.

If the voltage optimization value of the selected switch is lower than the existing voltage optimization value, the apparatus for controlling voltage in a power distribution system modifies a list of switches based on the selected switch at step S507.

The apparatus for controlling voltage in a power distribution system checks whether or not voltage optimization values of all the switches on the path have been calculated at step S508.

If the voltage optimization values of all the switches on the path have not been calculated, the apparatus for controlling voltage in a power distribution system selects another switch other than the specific switch from among the switching-target switches, as at step S504.

At step S509, if the voltage optimization values of all the switches on the path have been calculated, the apparatus for controlling voltage in a power distribution system checks whether or not the voltage optimization value of the selected switch is lower than the voltage optimization value V obtained at step S501.

If the voltage optimization value of the selected switch is lower than the voltage optimization value V obtained at step S501, the apparatus for controlling voltage in a power distribution system selects switches from among the switches on the path again. That is, the apparatus for controlling voltage in a power distribution system selects the switching-target switches again, thereby optimizing voltage by controlling the voltage.

Referring to FIG. 6, the apparatus for controlling voltage in a power distribution system optimizes voltage in the power distribution system voltage through the switching of a switch, thereby reducing the difference between voltages in the power distribution system, that is, the operating voltage of a power distribution line and the target voltage of the power distribution line, as illustrated in a distance-voltage graph (b) that is obtained after the voltage in the power distribution system has been controlled through the switching of a switch, as compared with a distance-voltage graph (a) that is obtained before the voltage in the power distribution system voltage is controlled.

Thereafter, if the voltage optimization value of the selected switch is higher than the voltage optimization value V obtained at step S501, the apparatus for controlling voltage in a power distribution system selects a tap that allows a bank-based voltage optimization value to be minimum while switching between the taps of a tap switching device when a load is applied at step S510.

As described above, the apparatus for controlling voltage in a power distribution system can optimize voltage by additionally manipulating a tap switching device when a load is applied, thereby being capable of reducing the difference between the operating voltage and target voltage of a power distribution line, as illustrated in the graph (c) of FIG. 6.

As described above, the optimum embodiments have been disclosed in the drawings and the specification. Although the specific terms have been used herein, they have been used merely for the purpose of describing the present invention, and have not been used to limit the meanings thereof and the scope of the present invention set forth in the claims. Therefore, it will be understood by those having ordinary knowledge in the art that various modifications and other equivalent embodiments can be made. As a result, the technical range of the protections of the present invention should be defined by the technical spirit of the attached claims.

The invention claimed is:

1. A voltage control apparatus for controlling voltage through switching of a switch present on a path in a power distribution system, the apparatus comprising:
   a processor including:
      a voltage optimization unit configured to determine switching-target switches from among switches present on the path, and to calculate a voltage optimization value of the determined switching-target switches; and
      a switch selection unit configured to select a switch corresponding to a location at which a voltage optimization value is minimum while moving locations of the switching-target switches, and to control voltage of the selected switch through switching of the selected switch,
   wherein the voltage optimization unit comprises:
   a voltage distribution value calculation unit configured to calculate a voltage distribution value of a transformer and a voltage distribution value of a power distribution line corresponding to the switching-target switches;
   a normalization unit configured to normalize the voltage distribution value of the transformer and the voltage distribution value of the power distribution line; and
   an optimization unit configured to calculate a voltage optimization value by applying target coefficients to each of the normalized values.

2. The voltage control apparatus of claim 1, wherein the switching of the switch is performed at a switch present on the path between points of two power distribution lines.

3. The voltage control apparatus of claim 1, wherein the voltage distribution value calculation unit calculates the voltage distribution value of the transformer using a target operation value of each substation, an operating voltage value of the substation, and a total number of transformers.

4. The voltage control apparatus of claim 1, wherein the voltage distribution value calculation unit calculates the voltage distribution value of the power distribution line using a target operating voltage value of the power distribution line, a voltage value between switches on the power distribution line, and a number of switch sections on the power distribution line.

5. The voltage control apparatus of claim 1, wherein the optimization unit applies a target coefficient corresponding to voltage optimization of a substation and a target coefficient corresponding to voltage optimization of the power distribution line to each of the normalized values.

6. The voltage control apparatus of claim 1, wherein the switch selection unit selects the specific switch from among the switching-target switches, compares an amount of circulation current with an allowable value when the specific switch is closed, and selects a switch corresponding to a location at which the voltage optimization value is minimum based on results of the comparison.

7. The voltage control apparatus of claim 6, wherein if the amount of circulation current is larger than the allowable value, the switch selection unit selects another switch other than the specific switch from among the switching-target switches, and compares an amount of circulation current with the allowable value again when the other switch is closed.

8. The voltage control apparatus of claim 6, wherein if the amount of circulation current is equal to or lower than the allowable value, the switch selection unit selects a switch corresponding to a location at which the voltage optimization value is minimum while moving locations of the switching-target switches.

9. The voltage control apparatus of claim 1, further comprising a check unit configured to check whether or not voltage optimization values of all the switches on the path have been calculated, and to check whether or not a voltage optimization value of the selected switch is lower than the voltage optimization value obtained by the voltage optimization unit.

10. The voltage control apparatus of claim 1, further comprising a tap selection unit configured to select a tap that allows a bank-based voltage optimization value to be minimum while switching between taps of a tap switching device when a load is applied.

11. The voltage control apparatus of claim 10, wherein the tap selection unit calculates the hank-based voltage optimization value using a target operating voltage value of the power distribution line, a voltage value between switches of the power distribution line within the bank, and a number of switch sections within the bank.

12. A method of controlling voltage in a power distribution system, the method comprising:
   determining switching-target switches from among switches present on a path in the power distribution system;
   calculating voltage optimization values of the determined switching-target switches;
   selecting a switch corresponding to a location at which the voltage optimization value is minimum while moving locations of the switching-target switches; and
   controlling voltage of the selected switch through switching of the selected switch,
   wherein calculating the voltage optimization values comprises:
   calculating a voltage distribution value of a transformer and a voltage distribution value of a power distribution line corresponding to the switching-target switches;
   normalizing the voltage distribution value of the transformer and the voltage distribution value of the power distribution line; and
   calculating each of the voltage optimization values by applying target coefficients to each of the normalized values.

13. The voltage control method of claim 12, wherein the voltage distribution value of the transformer is calculated using a target operation value of each substation, an operating voltage value of the substation, and a total number of transformers.

14. The voltage control method of claim 12, wherein the voltage distribution value of the power distribution line is calculated using a target operating voltage value of the power distribution line, a voltage value between switches on the power distribution line, and a number of switch sections on the power distribution line.

15. The voltage control method of claim 12, wherein controlling of the voltage comprises:
   selecting a tap that allows a bank-based voltage optimization value to be minimum while switching between taps of a tap switching device when a load is applied; and
   controlling the voltage via the tap.

16. The voltage control method of claim 12, wherein selecting the switch comprises selecting a specific switch from among the switching-target switches, comparing an amount of circulation current with an allowable value when the specific switch is closed, and selecting a switch corresponding to a location at which the voltage optimization value is minimum based on results of the comparison.

* * * * *